US010011801B2

(12) United States Patent
Deklippel et al.

(10) Patent No.: US 10,011,801 B2
(45) Date of Patent: Jul. 3, 2018

(54) ORGANOSILOXANE COMPOSITIONS

(71) Applicant: Dow Corning Corporation, Midland, MI (US)

(72) Inventors: Lorry Deklippel, Pieton (BE); Michael Salvatore Ferritto, Midland, MI (US); Don Lee Kleyer, Hemlock, MI (US); Andreas Stammer, Pont-a-Celles (BE); Herbert Stoegbauer, Huenfelden (DE); Vesna Weber, Appenheim (DE)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 15/038,155

(22) PCT Filed: Nov. 20, 2014

(86) PCT No.: PCT/US2014/066499
§ 371 (c)(1),
(2) Date: May 20, 2016

(87) PCT Pub. No.: WO2015/077391
PCT Pub. Date: May 28, 2015

(65) Prior Publication Data
US 2016/0281019 A1 Sep. 29, 2016

Related U.S. Application Data

(60) Provisional application No. 61/906,690, filed on Nov. 20, 2013.

(51) Int. Cl.
*C10M 107/50* (2006.01)
*C08G 77/24* (2006.01)
*C08L 83/04* (2006.01)
*C08G 77/00* (2006.01)

(52) U.S. Cl.
CPC ........... *C10M 107/50* (2013.01); *C08G 77/24* (2013.01); *C08G 77/80* (2013.01); *C08L 83/04* (2013.01); *C10M 2213/06* (2013.01); *C10M 2219/068* (2013.01); *C10M 2223/045* (2013.01); *C10M 2229/0515* (2013.01); *C10N 2230/06* (2013.01); *C10N 2230/10* (2013.01); *C10N 2240/02* (2013.01); *C10N 2240/04* (2013.01); *C10N 2240/10* (2013.01)

(58) Field of Classification Search
CPC ............ C10M 107/50; C10M 2213/06; C10M 2219/068; C10M 2223/045; C10M 2229/0515; C10N 2230/06; C10N 2230/10; C10N 2240/02; C10N 2240/04; C10N 2240/10; C08G 77/24; C08G 77/80; C08L 83/04
See application file for complete search history.

(56) References Cited

U.S. PATENT DOCUMENTS

| 3,006,878 | A | * | 10/1961 | Talcott | .................... C08L 83/04 |
|---|---|---|---|---|---|
| | | | | | 524/500 |
| 3,192,175 | A | | 6/1965 | Russell | |
| 3,433,765 | A | | 3/1969 | Geipel | |
| 3,689,412 | A | | 9/1972 | Quaal et al. | |
| 3,702,823 | A | * | 11/1972 | Kim | .......... C10M 3/00 |
| | | | | | 252/403 |
| 4,075,169 | A | | 2/1978 | Razzano | |
| 4,287,353 | A | * | 9/1981 | Bluestein | ............... C08G 77/08 |
| | | | | | 556/459 |
| 4,577,040 | A | | 3/1986 | Kaufmann et al. | |
| 5,914,420 | A | | 6/1999 | Buese et al. | |
| 2011/0040063 | A1 | | 2/2011 | Oishi et al. | |

FOREIGN PATENT DOCUMENTS

| GB | 1558816 | 1/1980 |
|---|---|---|
| JP | H05295377 A | 11/1993 |

OTHER PUBLICATIONS

PCT/US2014/066499 International Search Report dated Feb. 3, 2015, 4 pages.
English language abstract and machine translation for JPH05295377 (A) extracted from http://worldwide.espacenet.com database on Jun. 10, 2016, 12 pages.

* cited by examiner

*Primary Examiner* — James Goloboy
(74) *Attorney, Agent, or Firm* — Warner Norcross & Judd LLP

(57) ABSTRACT

A copolymer of polyalkylphenyl siloxane and alkylfluoroalkyl siloxane obtainable by reacting a dispersion of ingredient (i) an alkylfluoroalkyl siloxane and ingredient (ii) one or more polyalkylphenyl siloxane(s) in the presence of ingredient (iii) a basic catalyst at a temperature of between 40° C. to 300° C.

20 Claims, No Drawings

ORGANOSILOXANE COMPOSITIONS

CROSS-REFERENCE TO RELATED APPLICATIONS

This application is the National Stage of International Application No. PCT/US2014/066499 filed on 20 Nov. 2014, which claims priority to and all advantages of U.S. Patent Application No. 61/906,690 filed on 20 Nov. 2013, the content of which is hereby incorporated by reference.

This relates to copolymers of polyalkylphenyl siloxanes and alkylfluoroalkyl siloxanes, a process for their preparation and the uses thereof.

The viscosity of fluids which are used in lubricant compositions tend to vary with temperature. Typically fluid viscosities decrease with increasing temperature and vice versa, and these variations can have a significant effect on the lubricating nature of the lubricating composition. Amongst their many desired properties polyalkylphenylsiloxane based materials in particular phenylmethylsiloxanes, are known to have excellent high and low temperature behaviours, in that their viscosities vary far less under the influence of temperature, particularly at high (above 200° C.) temperatures and low (below −60° C.) temperatures which can be involved in lubrication applications. This feature alone makes them potentially desirable as ingredients in lubricant compositions because when present in a lubrication composition they cause the composition to have advantageously high Viscosity Index values which are desirable in lubricants.

Viscosity Index (VI) is an empirical, unitless number which indicates the rate of change in the viscosity of an oil within a given temperature range, usually between 40° C. and 100° C. The Viscosity Index is defined as the gradient of kinematic viscosities of a material, between 40° C. and 100° C. When the Viscosity Index is low (below 100) the fluid exhibits a relatively large change of viscosity with temperature. When the Viscosity Index is high (above 150), the fluid exhibits relatively little change of viscosity with temperature. In a variety of applications, a high or very high Viscosity Index is preferred.

Unfortunately, however the currently available polyalkylphenylsiloxanes such as polymethylphenylsiloxanes (PMPS) and compositions containing them show poor lubrication properties in respect to load carrying and anti wear properties, especially in metal to metal lubrication which limits the lubrication applications in which they can be utilised.

Alkylfluoroalkyl siloxanes for example methyltrifluoropropylsiloxanes (MTFPS), such as trimethyl silyl terminated methyltrifluorosiloxanes as depicted below show better lubrication than polyalkylphenylsiloxanes for example phenylmethylsiloxanes (PMPS) and other siloxane based fluids such as polydimethylsiloxanes (PDMS).

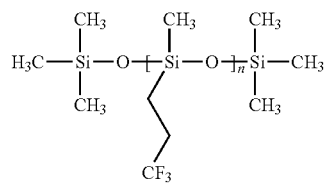

trimethyl silyl terminated methyltrifluoropropylsiloxane

However, MTFPS are not as stable at high temperatures (i.e. >200° C.) and therefore despite their lubricating properties the lubrication industry tends to rely on perfluoropolyether (PFPE) based materials to provide sufficient lubrication properties in respect to load carrying and anti wear properties in metal to metal lubrication in extreme (high and low) temperature conditions. Hence, there is a need for a more cost effective lubricant that can operate over a wide temperature range, has a high VI and good metal to metal lubrication.

Whilst a mixture of polyalkylphenyl siloxanes e.g. PMPS and alkylfluoroalkyl siloxanes e.g. MTFPS may appear a potential alternative to the use of PFPE, this is not possible because these siloxanes are effectively immiscible.

GB1558816 describes a fluorosiloxydiphenylsiloxy block copolymer and a process for producing the fluorosiloxydiphenylsiloxy block copolymer by reacting perfluoroalkylethylene substituted cyclic trisiloxane in the presence of a solvent promoter e.g. tetrahydrofuran, in the presence of a dilithium compound catalyst and then adding a diphenyl cyclic trisiloxane and allowing the reaction to go to the completion. Similar polymers are discussed in U.S. Pat. No. 4,075,169. The use of trifluoropropylmethylsiloxane gums in sealant formulations are described in U.S. Pat. No. 3,192,175 and methods for preparing fluorinated siloxanes are described in U.S. Pat. No. 5,914,420 and U.S. Pat. No. 4,577,040.

Surprisingly, despite their incompatibility, a method for copolymerising polyalkylphenyl siloxanes and alkylfluoroalkyl siloxanes has now been identified and the resulting copolymer has been found to provide unexpected advantages and as such is able to provide a silicone based alternative to PFPE for high temperature lubrication of metal-metal joints.

There is provided herein a copolymer of polyalkylphenyl siloxane and alkylfluoroalkyl siloxane obtainable by reacting a dispersion of an alkylfluoroalkyl siloxane comprising units of the following structure:

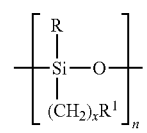

in which each R group may be the same or different and is selected from an alkyl having from 1 to 6 carbon atoms, alternatively 1 to 3 carbon atoms, alternatively R is methyl or ethyl, n is an integer, x is zero or an integer from 1 to 6 and $R^1$ is a perfluoroalkyl group which is either linear or branched and may contain from 1 to 12 carbon atoms and one or more polyalkylphenyl siloxane(s) comprising units of the following structure:

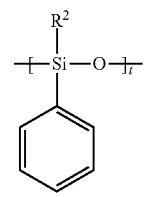

in which each $R^2$ group is the same or different and is selected from an alkyl group having from 1 to 6 carbon atoms, alternatively 1 to 3 carbon atoms, alternatively R is methyl or ethyl and t is an integer; at a temperature between 40° C. to 300° C., alternatively 40° C. to 250° C. in the presence of a basic catalyst.

There is further provided herein a method for preparing a copolymer of polyalkylphenyl siloxane and alkylfluoroalkyl siloxane reacting a dispersion of an alkylfluoroalkyl siloxane comprising units of the following structure:

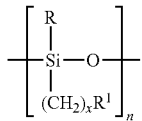

in which each R group may be the same or different and is selected from an alkyl having from 1 to 6 carbon atoms, alternatively 1 to 3 carbon atoms, alternatively R is methyl or ethyl, n is an integer, x is zero or an integer of from 1 to 6 inclusive and $R^1$ is a perfluoroalkyl group which is either linear or branched and may contain from 1 to 12 carbon atoms and one or more polyalkylphenyl siloxane comprising units of the following structure:

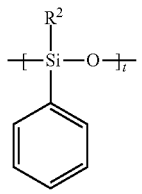

in which each $R^2$ group is the same or different and is selected from a linear or branched alkyl group having from 1 to 6 carbon atoms, alternatively 1 to 3 carbon atoms, alternatively R is methyl or ethyl and t is an integer; at a temperature between 40° C. to 300° C., alternatively 40° C. to 250° C. in the presence of a basic catalyst.

There is still further provided a copolymer of polyalkylphenyl siloxane and alkylfluoroalkyl siloxane comprising units of the following structure:

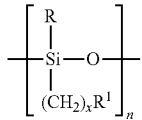

in which each R group may be the same or different and is selected from an alkyl having from 1 to 6 carbon atoms, n is an integer, x is zero or an integer from 1 to 6 and $R^1$ is a perfluoroalkyl group which is either linear or branched and may contain from 1 to 12 carbon atoms; and units of the following structure:

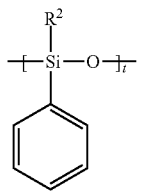

in which each $R^2$ group is the same or different and is selected from an alkyl group having from 1 to 6 carbon atoms; and t is an integer; wherein the copolymer is a random copolymer, a block copolymer or a mixture thereof. The polymer is obtainable by the method described above.

As hereinbefore described, the alkylfluoroalkyl siloxane comprises units of the following structure:

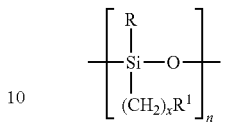

The alkylfluoroalkyl siloxane may have a linear, branched or cyclic structure. In the case of cyclic alkylfluoroalkyl siloxanes the cyclic material will generally contain between 3 and 15 of the above siloxane units. Each R group may be the same or different and is selected from an alkyl group having from 1 to 6 carbon atoms. Alternatively each R group may have from 1 to 3 carbon atoms; alternatively R is methyl or ethyl.

$R^1$ is a perfluoroalkyl group which is either linear or branched and may contain from 1 to 12 carbon atoms. Examples of suitable perfluoroalkyl groups include, perfluoromethyl, perfluoroethyl, perfluoro-n-propyl, perfluoro-iso-propyl, perfluoro-n-butyl, perfluoro-iso-butyl, perfluoro-tert-butyl, perfluoro-n-pentyl, perfluoro-isopentyl, perfluoroneo-pentyl, perfluorohexyl, perfluoroheptyl, perfluorooctyl, perfluorononyl, perfluorodecyl, perfluoroundecyl and perfluorododecyl or a mixture thereof.

Typically n in the alkylfluoroalkyl siloxane composition is preferably an integer greater than 1. The value of n is in reality commensurate with the viscosity of the alkylfluoroalkyl siloxane which is typically between 100 cst and 100 000 cst, (100 $mm^2s^{-1}$ and 100 000 $mm^2s^{-1}$) i.e. n is an integer resulting in the alkylfluoroalkyl siloxane having a viscosity in the range above. The viscosity of the polyalkylphenyl siloxane may alternatively be from 250 cst to 50 000 cst, (250 $mm^2s^{-1}$ to 50 000 $mm^2s^{-1}$) alternatively from 250 cst to 10 000 cst (250 $mm^2s^{-1}$ to 10 000 $mm^2s^{-1}$). The value of x is zero or an integer of from 1 to 6 inclusive, typically x is 1, 2 or 3, alternatively 2 or 3.

Viscosity values given throughout this document are either shown as dynamic viscosity values in mPa·s measured with a rotational viscometer Rheoplus from Anton Paar or as kinematic viscosity values in cSt ($mm^2s^{-1}$) measured with a capillary viscometer according to ASTM D445-06 and are measured at room temperature unless otherwise indicated.

When linear or branched, the alkylfluoroalkyl siloxane may have terminal silyl groups comprising alkyl groups containing 1 to 6 carbon atoms, hydroxyl groups and/or alkoxy groups containing 1 to 6 carbon atoms. The terminal silyl groups of the alkylfluoroalkyl siloxane may be of the structure:

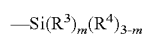

wherein $R^3$ is an alkyl group having 1 to 6 carbon atoms alternatively methyl or ethyl and $R^4$ is OH or an alkoxy group having between 1 and 6 carbon atoms alternatively OH, and m is 0, 1, 2 or 3, alternatively m is 1, 2 or 3, alternatively m is 2 or 3. The terminal silyl groups are bonded to the polymer backbone via an oxygen.

In one alternative the alkylfluoroalkyl siloxane is an MTFPS, typically comprising trialkylsilyl terminal groups.

The polyalkylphenyl siloxane(s) as hereinbefore described comprise(s) units of the following structure:

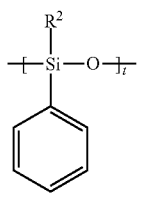

in which each R² group is the same or different and is selected from a linear or branched alkyl group having from 1 to 6 carbon atoms, alternatively 1 to 3 carbon atoms, alternatively R is methyl or ethyl; Typically t in the polyalkylphenyl siloxane(s) is an integer greater than 1. The value of t is commensurate with the viscosity of the or each polyalkylphenyl siloxane which is typically between 100 cst and 100 000 cst, (100 mm²s⁻¹ and 100 000 mm²s⁻¹) i.e. t is an integer resulting in the viscosity range above. The viscosity of the or each polyalkylphenyl siloxane may alternatively be from 250 cst to 50 000 cst (250 mm²s⁻¹ to 50 000 mm²s⁻¹), alternatively from 250 cst to 10 000 cst (250 mm²s⁻¹ to 10 000 mm²s⁻¹). The or in the case of a mixture, one or more than one polyalkylphenyl siloxane may be linear, branched or cyclic.

Similar to the aforementioned alkylfluoroalkyl siloxane, when linear or branched, the or each polyalkylphenyl siloxane may have terminal silyl groups comprising alkyl groups containing 1 to 6 carbon atoms, hydroxyl groups and/or alkoxy groups containing 1 to 6 carbon atoms. The terminal silyl groups of the or each polyalkylphenyl siloxane(s) may be of the structure:

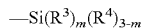

wherein R³ is an alkyl group having 1 to 6 carbon atoms alternatively methyl or ethyl and R⁴ is OH or an alkoxy group having between 1 and 6 carbon atoms alternatively OH, and m is 0, 1, 2 or 3, alternatively m is 1, 2 or 3, alternatively m is 2 or 3. The terminal silyl groups are bonded to the polymer backbone via an oxygen.

The polyalkylphenyl siloxane may be one or more PMPS, typically with trialkylsilyl terminal groups. Alternatively the polyalkylphenyl siloxane(s) may be a mixture of two polyalkylphenyl siloxanes, one polyalkylphenyl siloxane having trialkylsilyl terminal groups and the other polyalkylphenyl siloxane having dialkylhydroxy terminal groups with in both cases the each alkyl group being a methyl or ethyl group, alternatively a methyl group.

The two polymer types of the reaction composition may be intermixed in any appropriate combination to make a desired co-polymer but typically the ratio of the polymer reactants is between 10% by weight of alkylfluoroalkyl siloxane (e.g. MTFPS) to 90% polyalkylphenyl siloxane (e.g. PMPS) and 90% of alkylfluoroalkyl siloxane to 10% of polyalkylphenyl siloxane, alternatively 25% by weight of alkylfluoroalkyl siloxane to 75% by weight polyalkylphenyl siloxane and 75% of alkylfluoroalkyl siloxane to 25% of polyalkylphenyl siloxane, alternatively between 40% by weight of alkylfluoroalkyl siloxane and 60% polyalkylphenyl siloxane and 60% by weight of alkylfluoroalkyl siloxane to 40% of polyalkylphenyl siloxane, alternatively about 50% of each of alkylfluoroalkyl siloxane and polyalkylphenyl siloxane. In the case when the polyalkylphenyl siloxane is in the form of a mixture the values above are for the cumulative amount of polyalkylphenyl siloxane in said mixture.

The reaction typically takes place at a temperature of between 40° C. to 300° C., alternatively 50° C. to 300° C., alternatively between 100° C. and 300° C. or between 125° C. and 300° C., alternatively, 40° C. to 250° C., alternatively 50° C. to 250° C., alternatively between 100° C. and 250° C. or between 125° C. and 250° C.

Any suitable basic catalyst may be utilised. Examples include alkali metal hydroxides such as potassium or caesium hydroxide, alkali metal alkoxides or complexes of alkali metal hydroxides and an alcohol, alkali metal silanolates such as potassium silanolate or trimethylpotassium silanolate, tetra-alkyl phosphonium hydroxides and tetra-alkyl phosphonium silanolates, phosphonitrile halides (sometimes referred to as acidic phosphazenes) phosphazene bases and the catalyst derived by the reaction of a tetra-alkyl ammonium hydroxide and a siloxane tetramer as described in U.S. Pat. No. 3,433,765. Potassium hydroxide is particularly preferred as the catalyst. Typically the catalyst is present in an amount of 0.05 to 1 weight (wt) % of the starting reaction mixture, alternatively 0.05 to 0.5 wt % of the starting reaction mixture when present.

Dispersion polymerization generally affords micron-size monodisperse particles in a single batch process and may be defined as a type of precipitation polymerization in which one carries out the polymerization of a monomer in the presence of a suitable polymeric stabilizer soluble in the reaction medium (solvent). Surprisingly in this instance however it was identified that a solvent was not required for the preparation described above which is particularly surprising given the immiscibility of the two ingredients, as current expectations would have suggested the need for a homogeneous solution of monomer(s) with initiator and dispersant, in which sterically stabilized polymer particles are formed by the precipitation of the resulting polymers. Where appropriate the product of the reaction may have volatiles stripped therefrom typically at the same or a similar temperature at which the reaction been carried out but under reduced pressure e.g. from 0.5 to 6 mm Hg (66.66 Pa to 799.92 Pa).

The copolymer resulting from the reaction described above can vary in structure depending on the relative amounts of the starting materials. Hence, the co-polymer resulting from reactions in which the ratios of the ingredients is between 10% by weight of alkylfluoroalkyl siloxane to 90% polyalkylphenyl siloxane and 90% of alkylfluoroalkyl siloxane to 10% of polyalkylphenyl siloxane, alternatively 25% by weight of alkylfluoroalkyl siloxane to 75% by weight polyalkylphenyl siloxane and 75% of alkylfluoroalkyl siloxane to 25% of polyalkylphenyl siloxane, alternatively between 40% by weight of alkylfluoroalkyl siloxane and 60% polyalkylphenyl siloxane and 60% by weight of alkylfluoroalkyl siloxane to 40% of polyalkylphenyl siloxane, alternatively about 50% of each of alkylfluoroalkyl siloxane and polyalkylphenyl siloxane. will contain groups from each polymer type in approximately the same ratio when the reaction goes to completion. The nature of the polymer structure may be completely random, i.e. no pattern of intermixed groups of:

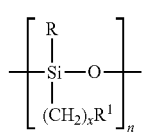

as described above and

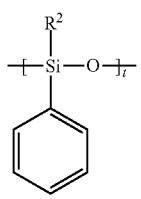

as described above. Alternatively the groups in the polymer may be in multiples of each unit above i.e. a block copolymer or alternatively a mixture of the two.

When used as or in a lubricant the copolymer may be alone, (i.e. no other ingredients present) or may contain one or more compatible additives.

Lubricant additives required in many applications are not soluble/miscible with alkylfluoroalkyl siloxanes such as MTFPS. Surprisingly it was found that such commercial additives are soluble/miscible with the copolymer as hereinbefore described. Hence, the copolymer prepared as hereinbefore described can be mixed with suitable additives.

Lubricant additives may be used to impart or improve certain properties to the lubricating composition. Such additives include friction modifiers, anti-wear additives, extreme pressure additives, seal swelling agents, rust and corrosion inhibitors, thickeners, Viscosity Index improvers, pour point depressants, anti-oxidants, free-radical scavengers, hydroperoxide decomposers, metal passivators, surface active agents such as detergents, emulsifiers, demulsifiers, defoamants, compatibilizers, dispersants, and mixtures thereof.

Further additives include tackifiers, antimicrobials, haze inhibitors, pigments & dyes.

Examples of friction modifiers include long-chain fatty acids and their derivatives, molybdenum compounds, aliphatic amines or ethoxylated aliphatic amines, ether amines, alkoxylated ether amines, acylated amines, tertiary amines, aliphatic fatty acid amides, aliphatic carboxylic acids, aliphatic carboxylic esters, polyol esters, aliphatic carboxylic ester-amides, imidazolines, aliphatic phosphonates, aliphatic phosphates, aliphatic thiophosphonates, aliphatic thiophosphates.

Examples of anti-wear additives and extreme pressure additives include organosulfur and organo-phosphorus compounds, such as organic polysulfides among which alkylpolysulfides; phosphates among which trihydrocarbyl phosphate, dibutyl hydrogen phosphate, amine salt of sulfurized dibutyl hydrogen phosphate, dithiophosphates such as zinc dialkyl dithiophosphates; dithiocarbamates dihydrocarbyl phosphate; sulfurized olefins, such as sulfurized isobutylene, and sulfurized fatty acid esters.

Examples of seal swell agents include esters, adipates, sebacates, azeealates, phthalates, sulfones such as 3-alkoxytetraalkylene sulfone, substituted sulfolanes, aliphatic alcohols of 8 to 13 carbon atoms such as tridecyl alcohol, alkylbenzenes, aromatics, naphthalene depleted aromatic compounds, mineral oils.

Examples of rust and corrosion inhibitors include monocarboxylic acids such as octanoic acid, decanoic acid and dodecanoic acid; polycarboxylic acids such as dimer and trimer acids from tall oil fatty acids, oleic acid, linoleic acid; thiazoles; triazoles such as benzotriazole, decyltriazole, 2-mercapto benzothiazole; thiadiazoles such as 2,5-dimercapto-1,3,4-thiadiazole; 2-mercapto-5-hydrocarbyldithio-1,3,4-thiadiazole; metal dithiophosphates; ether amines; acid phosphates; amines; polyethoxylated compounds such as ethoxylated amines; ethoxylated phenols; ethoxylated alcohols; imidazolines; aminosuccinic acids.

Examples of thickeners include metallic soaps such as lithium soaps and mixtures therewith e.g. lithium complex soaps, silica, expanded graphite, polytetrafluoroethylene (PTFE) polyurea, clays such as hectorite or bentonite. The amount of thickener utilised in a composition may differ depending on application (i.e. whether the end product is a grease) and the preferred thickener which may be selected dependent on the intended use for the lubricant composition. For example soaps may be used in the range of from 8 to 35% wt of the composition, alternatively 8 to 20% wt of the composition, alternatively 10 to 15% wt; PTFE may be used in an amount of from 15 to 55%, alternatively 30 to 55% wt of the composition and silica when used as a thickener might be used at comparatively low ranges of from 1-10% wt, alternatively 1 to 5% wt.

In some instances, when thickened, the lubricant composition may become a grease composition.

Examples of Viscosity Index improvers include polymethacrylates, olefin copolymers, polyisoalkylene such as polyisobutylene, styrene-diene copolymers, and styrene-ester copolymers such as styrenemaleic ester.

Examples of pour point depressants include wax-alkylated naphthalenes and phenols, polymethacrylates, styrene-ester copolymers.

Examples of anti-oxidants include phenolic antioxidants such as 2,6-di-tert-butylphenol, tertiary butylated phenols such as 2,6-di-tert-butyl-4-methylphenol, 4,4'-methylenebis (2,6-di-tert-butylphenol),2,2'-methylenebis(4-methyl6-tert-butylphenol), 4,4'-thiobis(2-methyl-6-tert-butylphenol); mixed methylene-bridged polyalkyl phenols; aromatic amine antioxidants; sulfurized phenolic antioxidants; organic phosphites; amine derivatives such as p-, p'-dioctyldiphenylamine, N,N'-di-sec-butylphenylenediamine, 4-isopropylaminodiphenylamine, phenyl-.alpha.-naphthyl amine, ring-alkylated diphenylamines; bisphenols; cinnamic acid derivatives.

Examples of free-radical scavengers include zinc dialkyl dithiophosphates, hindered phenols, and alkylated arylamines.

Examples of hydroperoxide decomposers include organosulfur compounds and organo-phosphorus compounds.

Examples of metal passivators include poly-functional (polydentate) compounds, such as ethylenediaminetetraacetic acid (EDTA) and salicylaldoxime.

Examples of surface active agents such as detergents, dispersants, emulsifiers, demulsifiers include alkali metal or alkaline earth metal salts of organic acids such as magnesium sulfonate, zinc sulfonate, magnesium phenate, zinc phenate, lithium sulfonate, lithium carboxylate, lithium salicylate, lithium phenate, sulfurized lithium phenate, magnesium sulfonate, magnesium carboxylate, magnesium salicylate, magnesium phenate, sulfurized magnesium phenate, potassium sulfonate, potassium carboxylate, potassium salicylate, potassium phenate, sulfurized potassium phenate; common acids such as alkylbenzenesulfonic acids, alkylphenols, fatty carboxylic acids, polyamine, polyhydric alcohol derived polyisobutylene derivatives.

Examples of defoamants include polysiloxanes, polyacrylates and styrene ester polymers.

Examples of compatibilizers include aromatic hydrocarbons such as 1-methyl-naphthalene, aromatic ethers such as diphenyl ether or anisole (methyl phenyl ether), long chain alcohols such as nonyl phenol, octanol and decanol.

Examples of dispersants include alkenylsuccinimide such as polyisobutylene succinimide, N-substituted polyisobutenyl succinimides such as polyisobutenyl succinimide-polyethylenepolyamine, succinates, succinate esters, alkyl methacrylate-vinyl pyrrolidinone copolymers, alkyl methacrylate-dialkylaminoethyl methacrylate copolymers, alkylmethacrylate-polyethylene glycol methacrylate copolymers, polystearamides, high molecular weight amines, phosphoric acid derivatives such as bis-hydroxypropyl phosphorate.

Some additives may possess multiple properties and provide for a multiplicity of affects. For example, graphite and molybdenum disulfide may both be used as friction modifiers and extreme pressure additives or functionalized soaps may be used to thicken but also provide extreme pressure and antiwear performances for greases. This approach is well known by the person skilled in the art and need not be further elaborated herein.

An additive may be used alone or in combination with other additives.

When present in the lubricant composition of the invention, the sole or multiple additive(s) may be used at a level of from 0 to 10 wt %, alternatively 0.1 to 5 wt %, based on the total weight of the lubricant composition. Thickeners to produce greases may be used at a level of from 1, to 55% wt, alternatively 1 to 45% wt, alternatively 3 to 30% wt based on the total weight of the lubricant grease composition as discussed above.

Hence, a lubricant comprising the copolymer as described above may comprise: 0 to 10 weight % of one or more additives and 90 to 100 weight % of copolymer; alternatively from 0.1 to 10 weight % of one or more additives and 90 to 99.9 weight % of copolymer or further alternatively 0.1 to 5% by weight additive and 99.9 to 95% of copolymer (in each case the sum total being 100 weight %).

In the case of a lubricant grease composition the composition may comprise: 0 to 10 weight % of one or more additives (excluding thickeners),
1 to 55% wt of thickeners and the remainder of the composition being copolymer as hereinbefore described; Alternatively the composition may comprise: 0 to 10 weight % of one or more additives (excluding thickeners), 1 to 50% wt of thickeners and the remainder of the composition being copolymer as hereinbefore described; alternatively, a lubricant grease composition the composition may comprise: 0 to 10 wt % of one or more additives (excluding thickeners), 3 to 30 weight % of thickeners and the remainder of the composition being copolymer as hereinbefore described. Alternatively a lubricant grease composition the composition may comprise:
0.1 to 5 weight % of one or more additives (excluding thickeners)
3 to 30 weight % of thickeners and the remainder of the composition being copolymer as hereinbefore described. Alternatively the composition may be any combination of the ingredients discussed above with the total composition being 100 weight %.

Typically the Viscosity Index of the copolymer and/or lubricant containing a copolymer as described above has a value of at least 125, alternatively at least 150 as measured in accordance with ASTM D 2270-10e1.

Operating temperatures for the use of the lubricant composition, meaning the temperatures at which the lubricant composition may be used for prolonged time (also called service temperatures), range of from −55° C. to +250° C. Short term peak temperatures may be higher.

The above relative amounts of ingredients in compositions are intended to relate to all embodiments and possible combinations thereof described above.

The copolymers show improved heat stability versus pure MTFPS and surprisingly better lubricating properties such as load carrying capacity and wear (as discussed in the following examples) than either PMPS or MTFPS.

Lubricating compositions may be used in a variety of applications where friction occurs between rubbing surfaces. The surfaces may be plastic or metal.

The present invention includes a method to lubricate metal-metal surfaces comprising:
i. obtaining a lubricant composition comprising the composition as hereinbefore described and;
ii. lubricating the metal-metal surface with said lubricant composition.

The present lubricant composition may be used in any system that includes machine elements that contain gears of any kind and roller bearings. Examples of such systems include electricity generating systems, industrial manufacturing equipments such as paper, steel and cement mills hydraulic systems, automotive drive trains, aircraft propulsion systems, etc.

Further systems include crankcases, internal combustion engines such as 2-stroke engines, 4-stroke engines, diesel engines, gears for manual or differential transmission systems, traction and torque systems.

The lubricant composition may be used as industrial lubricants, hydraulic fluids, heat transfer fluids, compressor oils or fluids, turbine oils, metal working fluids, metal forming lubricant, lubrication grease, as an automatic transmission fluid, a manual transmission fluid, sliding contact bearings lubricant, lubricant for chains, an axle lubricant, a transaxle lubricant, an industrial gear lubricant, a circulating lubricant, a gear oil for wind turbines, an open gear lubricant and/or an enclosed gear lubricant.

The fluids are furthermore of interest as antifoams, especially for oil and gas applications, and potentially as plasticizers in silicone elastomers The disclosure will now be described by way of Example. Viscosity values given throughout this document are either shown as dynamic viscosity values in mPa·s measured with a rotational viscometer Rheoplus from Anton Paar or as kinematic viscosity values in cSt $(mm^2s^{-1})^{measured}$ with a capillary viscometer according to ASTM D445-06. All viscosity measurements were taken at room temperature (approximately 20° C.) unless otherwise indicated.

EXAMPLE 1

Preparation of the Co-Polymer
A Variety of Co-Polymers were Prepared Using the Process as Hereinbefore Described. The Resulting Products were Used in a Variety of Test Described in Detail Below.

a.) 100.12 g of a trimethylsilyl terminated polymethylphenylsiloxane having a viscosity of 500 cst (500 $mm^2s^{-1}$), 114.54 g trimethylsilyl terminated methyltrifluoropropylsiloxane having a viscosity of 300 cst (300 $mm^2s^{-1}$) and 0.97 g KOH (1N) were added to a flask. The mixture was heated to 140° C. under vigorous stirring. A white dispersion is formed. The mixture is kept at 140° C. for one hour under a nitrogen stream. The mixture became clear after approx. 20 minutes. The mixture is then cooled down and dry ice is added to neutralize the KOH. A clear liquid having a viscosity of 80 mPa·s at 40° C. was obtained. Si-NMR confirmed that a copolymer was formed during the reaction.

b.) 151.51 g a trimethylsilyl terminated polymethylphenylsiloxane having a viscosity of 500 cst (500 mm$^2$s$^{-1}$), 521 g trimethylsilyl terminated methyltrifluoropropylsiloxane having a viscosity of 300 cst (300 mm$^2$s$^{-1}$) and 3.05 g KOH (1N) were added to a flask. The mixture was heated to 140° C. under vigorous stirring. A white dispersion is formed. The mixture is kept at 140° C. for one 30 minutes under a nitrogen stream. The mixture became clear after approx. 20 minutes. The mixture is then cooled down and dry ice is added to neutralize the KOH. A clear liquid having a viscosity of 67 mPa·s at 40° C. was obtained.

c.) 450.04 g a trimethylsilyl terminated polymethylphenylsiloxane having a viscosity of 500 cst (500 mm$^2$s$^{-1}$), 172.72 g trimethylsilyl terminated methyltrifluoropropylsiloxane having a viscosity of 300 cst (300 mm$^2$s$^{-1}$) and 3.07 g KOH (1N) were added to a flask. The mixture was heated to 140° C. under vigorous stirring. A white dispersion is formed. The mixture is kept at 140° C. for one hour under a nitrogen stream. The mixture became clear after approx. 20 minutes. The mixture is then cooled down and dry ice is added to neutralize the KOH. A clear liquid having a viscosity of 109 mPa·s at 40° C. was obtained.

d.) 303.02 g a trimethylsilyl terminated polymethylphenylsiloxane having a viscosity of 500 cst (500 mm$^2$s$^{-1}$), 332.29 g trimethylsilyl terminated methyltrifluoropropylsiloxane having a viscosity of 1000 cst (1000 mm$^2$s$^{-1}$) and 3.05 g KOH (1N) were added to a flask. The mixture was heated to 140° C. under vigorous stirring. A white dispersion is formed. The mixture is kept at 140° C. for one hour under a nitrogen stream. The mixture became clear after approx. 20 minutes. The mixture is then cooled down and dry ice is added to neutralize the KOH. A clear liquid having a viscosity of 90 mPa·s at 40° C. was obtained.

e.) The preparation utilized in example 1b above was repeated. However in this case once the crude product was obtained, volatiles were removed by using a wiped film evaporator (Pope Scientific Inc of Saukville, Wis.) at 200° C./66.66 Pa (0.5 mmHg). A clear liquid was obtained that had a viscosity of 298 mPa·s at 40° C.

f.) The preparation utilized in example 1a above was repeated. However in this case once the crude product was obtained, volatiles were removed by using a wiped film evaporator (Pope Scientific Inc of Saukville, Wis.) at 200° C./66.66 Pa (0.5 mmHg). A clear liquid was obtained that had a viscosity of 308 mPa·s at 40° C.

g.) The preparation utilized in example 1c above was repeated. However, in this case once the crude product was obtained, volatiles were removed by using a wiped film evaporator (Pope Scientific Inc of Saukville, Wis.) at 200° C./66.66 Pa (0.5 mmHg). A clear liquid was obtained that had a viscosity of 391 mPa·s at 40° C.

EXAMPLE 2

The Oxidation stability of the copolymers produced via methods 1b, 1c and 1d in Example 1 were tested. The test were undertaken using differential scanning calorimetry (DSC) with the oxidative onset temperature at a heating rate of 10° C./min under an air flow of 60 ml/min. Load carrying capacity (LCC) was also tested on the samples of the same copolymers using ASTM D5706-05 with a cylinder on plate geometry at a reduced oscillating frequency of 10 Hz. The LCC is expressed in OK load presenting the step (increased in 50N increments every 2 min) load where friction was stable.

The following table shows a comparison between the copolymeric products produced in example 1 from methods 1b, 1c and 1d, trimethylsilyl terminated polydimethylsiloxane having a viscosity of 50 cSt (500 mm$^2$s$^{-1}$), and the starting materials from Example 1a, 1b and 1c, trimethylsilyl terminated polymethylphenylsiloxane having a viscosity of 500 cSt (500 mm$^2$s$^{-1}$) and trimethylsilyl terminated methyltrifluoropropylsiloxane having a viscosity of 300 cSt (500 mm$^2$s$^{-1}$).

Table 1

TABLE 1

| Material | Oxidation onset (° C.) (differential scanning calorimetry (DSC)) | Ok load (N) (LCC) |
|---|---|---|
| Example 1b | 299 | 1650 |
| Example 1c | 339 | 1800 |
| Example 1d | 266 | 800 |
| trimethylsilyl terminated methyltrifluoropropylsiloxane | 246 | 550 |
| trimethylsilyl terminated polydimethylsiloxane | 300 | 300 |
| trimethylsilyl terminated polymethylphenylsiloxane | 376 | 150 |

The table shows that the copolymer has improved load carrying versus the homopolymers and a better oxidation stability than the trimethylsilyl terminated methyltrifluoropropylsiloxane and even polydimethylsiloxane.

EXAMPLE 3

Four ball wear scars were determined for the products of the methods described in examples 1e, 1f and 1g in combination with a variety of standard additives in lubricant compositions as indicated in Table 2 below.

Wear properties or lubrication performance may be evaluated by standard test method DIN 51350-3 'Testing of lubricants in the Shell four-ball tester'. The Shell Four Ball Tester (FBT) is a testing device used to determine welding and metal loads as well as different friction and wear characteristics of lubricants. The standard test consists of a rotating ball bearing being pressed onto three similar but immobile balls while applying a load of 100N, 400N and 800N for 1 hour test duration. Wear is determined by optically measuring the formed calotte (the worn depression area).

This testing device is especially common in the lubricant industry where it is used for routine product development and quality control testing. The friction torque can be recorded continuously.

In this instance the testing was done according to DIN 51350-3 and the wear scar is reported as the average of the three steel balls in mm after applying a load of 400N and 800N for 1 hour test duration (i.e. no 100N test undertaken). The results can be seen in Table 2 below:

TABLE 2

| Copolymer | Additive | Wear scar (mm) at 400 N | Wear scar (mm) at 800 N |
|---|---|---|---|
| Example 1e | — | 0.55 | 1.81 |
| Example 1e | 1% VL622 | 0.51 | 0.71 |
| Example 1e | 2.5% VL 622 | 0.68 | 1.00 |
| Example 1e | 2.5% VL AZ | 0.72 | 1.32 |
| Example 1f | — | 1.78 | 2.5 |

TABLE 2-continued

| Copolymer | Additive | Wear scar (mm) at 400 N | Wear scar (mm) at 800 N |
|---|---|---|---|
| Example 1f | 2.5% VL 622 | 0.55 | 1.03 |
| Example 1f | 2.5% VL AZ | 0.51 | 1.07 |
| Example 1g | — | 1.53 | Not measurable |
| Example 1g | 2.5% VL 622 | 2.20 | 2.38 |
| Example 1g | 4% Anglamol 99 | 0.90 | 1.47 |
| trimethylsilyl terminated methyltrifluoropropylsiloxane | — | 1.18 | 1.17 |
| trimethylsilyl terminated polymethylphenylsiloxane | — | Not measurable | Not measurable |
| Comparative PAO 6 | 4% Anglamol 99 | 0.71 | 1.34 |
| Comparative PFPE Y25 | — | 1.01 | 1.58 |

PAO 6 is a commercial polyalphaolefin named PAO SpectraSyn ™ 6 from ExxonMobil Chemicals.
PFPE Y25 is a commercial perfluoropolyether named Fomblin ® Y25 from Solvay.
VL 622 and VL AZ are commercial additives named Vanlube 622 and Vanlube AZ from R.T. Vanderbilt.
Anglamol 99 is a commercial additive named Anglamol ® 99 from Lubrizol.

EXAMPLE 4

In this Example a cyclic methyltrifluoropropylsiloxane with n=3 is utilised in combination with two different polymethylphenylsiloxanes to prepare the copolymer, using the same method as discussed in Example 1.

26.78 g of a trimethylsilyl terminated polymethylphenylsiloxane having a viscosity of 500 cst, (500 mm$^2$s$^{-1}$), 154.88 g of a hydroxydimethylsilyl terminated polymethylphenylsiloxane having a viscosity of 500 cst, (500 mm$^2$s$^{-1}$). 68.37 g of a methyltrifluoropropylsiloxane cyclotrisiloxane and 0.18 g KOH were added to a flask. The mixture was heated to 140° C. under vigorous stirring. A white dispersion is formed initially. The mixture is kept at 140° C. for one hour under a nitrogen sweep. The mixture became clear after approx. 30 minutes. The mixture is then cooled down and dry ice is added to neutralize the KOH. Volatiles are removed from the product by using a wiped film evaporator (Pope Scientific Inc of Saukville, Wis.) at 200° C./66.66 Pa (0.5 mmHg). A clear liquid having a viscosity of 20,300 mPa·s at 20° C. was obtained. Si-NMR confirmed that a copolymer was formed during the reaction. The resulting product had a wear scar of 1.5 mm at 400N and an oxidation onset of 475° C. using the methods described above in Examples 2 and 3.

The invention claimed is:

1. A method for preparing a copolymer of polyalkylphenyl siloxane and alkylfluoroalkyl siloxane comprising reacting a dispersion of
  ingredient (i) an alkylfluoroalkyl siloxane comprising units of the following structure:

$$\left[ \begin{array}{c} R \\ | \\ Si-O \\ | \\ (CH_2)_xR^1 \end{array} \right]_n$$

in which each R group may be the same or different and is selected from an alkyl having from 1 to 6 carbon atoms, n is an integer, x is zero or an integer from 1 to 6 and $R^1$ is a perfluoroalkyl group which is either linear or branched and may contain from 1 to 12 carbon atoms; and
  ingredient (ii) one or more polyalkylphenyl siloxane(s) comprising units of the following structure:

$$\left[ \begin{array}{c} R^2 \\ | \\ Si-O \\ | \\ \phi \end{array} \right]_t$$

in which each $R^2$ group is the same or different and is selected from an alkyl group having from 1 to 6 carbon atoms and t is an integer;
  in the presence of
  ingredient (iii) a basic catalyst
  at a temperature of between 40° C. to 300° C.; and
  wherein ingredient (ii) comprises a trialkylsilyl terminated siloxane.

2. The method for preparing a copolymer of polyalkylphenyl siloxane and alkylfluoroalkyl siloxane in accordance with claim 1, wherein:
  a) the alkylfluoroalkyl siloxane is linear or branched and has viscosity of from 100 cst to 100,000 cst (100 mm$^2$s$^{-1}$ to 100,000 mm$^2$s$^{-1}$) at 25° C. with a capillary viscometer according to ASTM D445-06;
  b) the polyalkylphenyl siloxane has a viscosity of from 250 cst to 50,000 cst (250 mm$^2$s$^{-1}$ to 50,000 mm$^2$s$^{-1}$) at 25° C. with a capillary viscometer according to ASTM D445-06; or
  c) both a) and b).

3. The method for preparing a copolymer of polyalkylphenyl siloxane and alkylfluoroalkyl siloxane in accordance with claim 1, wherein the alkylfluoroalkyl siloxane is cyclic and n is from 3 to 15.

4. The method for preparing a copolymer of polyalkylphenyl siloxane and alkylfluoroalkyl siloxane in accordance with claim 1, wherein $R^1$ in the alkylfluoroalkyl siloxane is a perfluoroalkyl group which is either linear or branched and contains from 1 to 12 carbon atoms.

5. The method for preparing a copolymer of polyalkylphenyl siloxane and alkylfluoroalkyl siloxane in accordance with claim 1, wherein ingredient (i) and ingredient (ii) are intermixed in a ratio of from between 10 weight % of ingredient (i): 90 weight % of ingredient (ii) to 90 weight % of ingredient (i): 10 weight % of ingredient (ii) based on the total weight of ingredient (i) and ingredient (ii) being 100 weight %.

6. The method for preparing a copolymer of polyalkylphenyl siloxane and alkylfluoroalkyl siloxane in accordance with claim 1, wherein ingredient (ii) is a mixture of polyalkylphenyl siloxanes including the trialkylsilyl terminated siloxane.

7. The method for preparing a copolymer of polyalkylphenyl siloxane and alkylfluoroalkyl siloxane in accordance with claim 1, wherein the basic catalyst is selected from one or more alkali metal hydroxides, alkali metal alkoxides or complexes of alkali metal hydroxides and an alcohol, alkali metal silanolates, tetra-alkyl phosphonium hydroxides and tetra-alkyl phosphonium silanolates, phosphonitrile halides, phosphazene bases and the catalyst derived by the reaction of a tetra-alkyl ammonium hydroxide and a siloxane tetramer.

8. The method for preparing a copolymer of polyalkylphenyl siloxane and alkylfluoroalkyl siloxane in accordance with claim 4, wherein the perfluoroalkyl group is selected from perfluoromethyl, perfluoroethyl, perfluoro-n-propyl, perfluoro-iso-propyl, perfluoro-n-butyl, perfluoro-iso-butyl, perfluoro-tert-butyl, perfluoro-n-pentyl, perfluoro-isopentyl, perfluoroneo-pentyl, perfluorohexyl, perfluoroheptyl, perfluorooctyl, perfluorononyl, perfluorodecyl, perfluoroundecyl and perfluorododecyl or a mixture thereof.

9. The method for preparing a copolymer of polyalkylphenyl siloxane and alkylfluoroalkyl siloxane in accordance with claim 7, wherein the basic catalyst is potassium hydroxide.

10. The method for preparing a copolymer of polyalkylphenyl siloxane and alkylfluoroalkyl siloxane in accordance with claim 6, wherein ingredient (ii) comprises the trialkylsilyl terminated siloxane and a dialkylhydroxy terminated siloxane.

11. The method for preparing a copolymer of polyalkylphenyl siloxane and alkylfluoroalkyl siloxane in accordance with claim 1, further comprising stirring ingredients i) and ii) to form the dispersion and at least one of:
    heating the dispersion and holding the temperature between 100° C. and 300° C. during reaction;
    sweeping the dispersion with nitrogen during reaction;
    cooling the dispersion after reaction;
    neutralizing the basic catalyst; and
    stripping the dispersion after reaction.

12. A method for preparing a copolymer of polyalkylphenyl siloxane and alkylfluoroalkyl siloxane comprising:
    stirring ingredients (i) and (ii) to form a dispersion, wherein ingredient (i) is an alkylfluoroalkyl siloxane comprising units of the following structure:

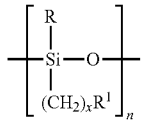

in which each R group may be the same or different and is selected from an alkyl having from 1 to 6 carbon atoms, n is an integer, x is zero or an integer from 1 to 6 and $R^1$ is a perfluoroalkyl group which is either linear or branched and may contain from 1 to 12 carbon atoms; and
    ingredient (ii) is one or more polyalkylphenyl siloxane(s) comprising units of the following structure:

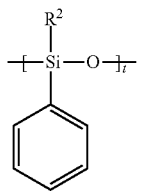

in which each $R^2$ group is the same or different and is selected from an alkyl group having from 1 to 6 carbon atoms and t is an integer;
    reacting the dispersion of ingredients (i) and (ii) in the presence of ingredient (iii), a basic catalyst, at a temperature of between 40° C. to 300° C.; and at least one of:
    sweeping the dispersion with nitrogen during reaction;
    cooling the dispersion after reaction;
    neutralizing ingredient (iii); and
    stripping the dispersion after reaction.

13. The method for preparing a copolymer of polyalkylphenyl siloxane and alkylfluoroalkyl siloxane in accordance with claim 12, comprising at least one of sweeping the dispersion with nitrogen during reaction, and stripping the dispersion after reaction.

14. The method for preparing a copolymer of polyalkylphenyl siloxane and alkylfluoroalkyl siloxane in accordance with claim 12, further comprising heating the dispersion and holding the temperature between 100° C. and 300° C. during reaction.

15. The method for preparing a copolymer of polyalkylphenyl siloxane and alkylfluoroalkyl siloxane in accordance with claim 12, wherein:
    a) the alkylfluoroalkyl siloxane is linear or branched and has viscosity of from 100 cst to 100,000 cst (100 $mm^2s^{-1}$ to 100,000 $mm^2s^{-1}$) at 25° C. with a capillary viscometer according to ASTM D445-06;
    b) the polyalkylphenyl siloxane has a viscosity of from 250 cst to 50,000 cst (250 $mm^2s^{-1}$ to 50,000 $mm^2s^{-1}$) at 25° C. with a capillary viscometer according to ASTM D445-06; or
    c) both a) and b).

16. The method for preparing a copolymer of polyalkylphenyl siloxane and alkylfluoroalkyl siloxane in accordance with claim 12, wherein the alkylfluoroalkyl siloxane is cyclic and n is from 3 to 15.

17. The method for preparing a copolymer of polyalkylphenyl siloxane and alkylfluoroalkyl siloxane in accordance with claim 12, wherein $R^1$ in the alkylfluoroalkyl siloxane is a perfluoroalkyl group which is either linear or branched and contains from 1 to 12 carbon atoms, optionally wherein the perfluoroalkyl group is selected from perfluoromethyl, perfluoroethyl, perfluoro-n-propyl, perfluoro-iso-propyl, perfluoro-n-butyl, perfluoro-iso-butyl, perfluoro-tert-butyl, perfluoro-n-pentyl, perfluoro-isopentyl, perfluoroneo-pentyl, perfluorohexyl, perfluoroheptyl, perfluorooctyl, perfluorononyl, perfluorodecyl, perfluoroundecyl and perfluorododecyl or a mixture thereof.

18. The method for preparing a copolymer of polyalkylphenyl siloxane and alkylfluoroalkyl siloxane in accordance with claim 12, wherein ingredient (i) and ingredient (ii) are intermixed in a ratio of from between 10 weight % of ingredient (i): 90 weight % of ingredient (ii) to 90 weight % of ingredient (i): 10 weight % of ingredient (ii) based on the total weight of ingredient (i) and ingredient (ii) being 100 weight %.

19. The method for preparing a copolymer of polyalkylphenyl siloxane and alkylfluoroalkyl siloxane in accordance with claim 12, wherein ingredient (ii) is a mixture of polyalkylphenyl siloxanes.

20. The method for preparing a copolymer of polyalkylphenyl siloxane and alkylfluoroalkyl siloxane in accordance with claim 12, wherein the basic catalyst is selected from one or more alkali metal hydroxides, alkali metal alkoxides or complexes of alkali metal hydroxides and an alcohol, alkali metal silanolates, tetra-alkyl phosphonium hydroxides and tetra-alkyl phosphonium silanolates, phosphonitrile halides, phosphazene bases and the catalyst derived by the reaction of a tetra-alkyl ammonium hydroxide and a siloxane tetramer, optionally wherein the basic catalyst is potassium hydroxide.

* * * * *